June 7, 1932.  A. W. MORTON  1,862,059
PISTON RING
Filed April 17, 1931
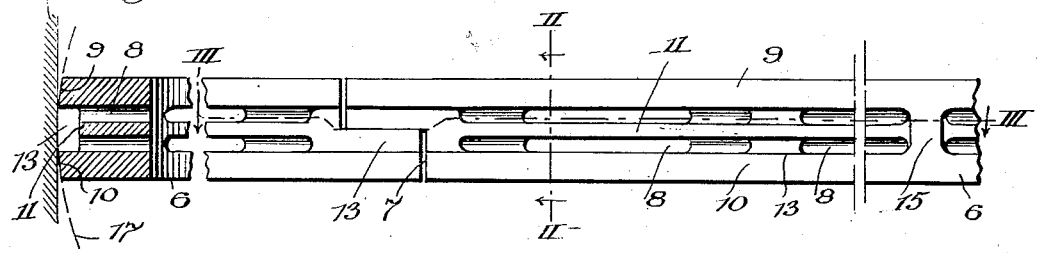
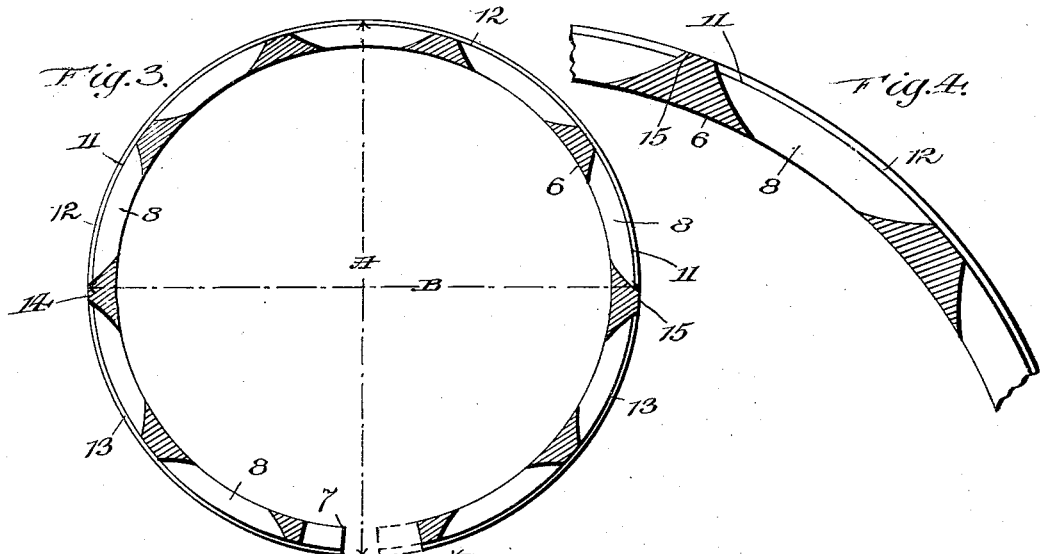
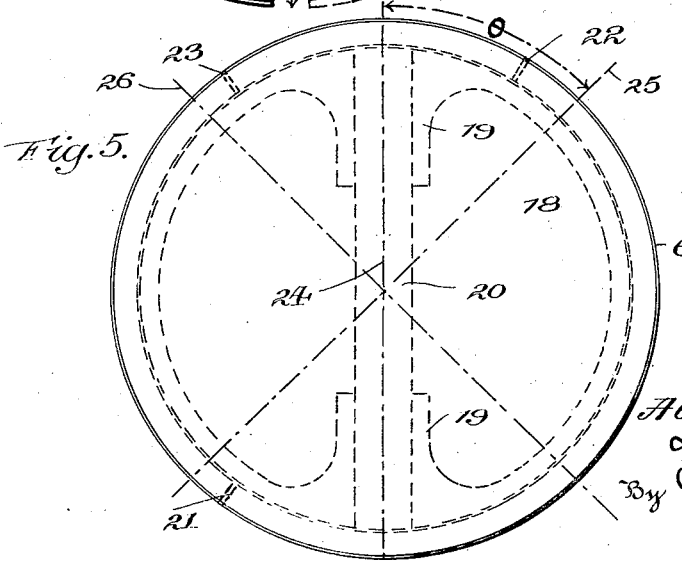
Inventor:
Allen W. Morton,
By Attorneys.

Patented June 7, 1932

1,862,059

UNITED STATES PATENT OFFICE

ALLEN W. MORTON, OF BALTIMORE, MARYLAND, ASSIGNOR TO THE AMERICAN HAMMERED PISTON RING COMPANY, OF BALTIMORE, MARYLAND, A CORPORATION OF MARYLAND

PISTON RING

Application filed April 17, 1931. Serial No. 530,963.

My invention relates to piston rings, and particularly to rings containing radial slots to facilitate oil circulation.

Slotted rings have been known heretofore in the prior art, but only since the development of modern high speed, high compression engines has their importance been fully realized. In this type of engine the ring action is materially improved if the outer face of the ring is grooved, thereby increasing the number of oil scraping edges. The action is further enhanced by cutting radial slots in the ring to connect these grooves with the inner face of the ring so as to provide channels for conveying oil back to the engine crank case through a drilled piston. It has been proposed to provide a single circumferential groove extending entirely around the outer face of such rings so as to improve oil circulation, but such an arrangement does not necessarily accomplish this purpose in out of round and worn cylinders.

I find it preferable, for reasons which will presently appear, to provide a plurality of grooves whose ends are separated from each other at points spaced from the ring joint so as to cause the oil to be more or less evenly distributed around the ring, and to counteract the tendency of the oil to accumulate on one side of the piston, but cause the oil to circulate in all directions.

Accordingly, my improvement consists in constructing a one-piece split ring containing a series of spaced radial slots, and then forming arcuate grooves in the outer face of the ring in registry with the slots. The grooves are separated at points remote from the ring joint thereby inducing proper circulation of the oil and materially improving the ventilating action of the ring.

Another object of my invention is to produce a slotted oil ring containing two sets of parallel radial slots, certain of which are connected by oil grooves in such manner as to insure proper lubrication when such rings are installed in badly worn cylinders.

Another object of my invention is to construct a ring of this character so as to avoid the formation of corners in which carbon can collect.

A further object of the invention is to construct a ring in which the center land between the slots is spaced from the outer face of the ring, so that this land can be made very thin without danger of breakage in service.

Still another object of the invention is to form a slotted ring in which the side lands can be made heavy enough to prevent ring breakage during installation, and also to prevent breakage when the cylinder-contacting faces become worn.

Other objects will appear from the following description when read in connection with the accompanying drawing, in which:—

Fig. 1 is a view in elevation, with parts broken away, of one form of slotted ring embodying my invention;

Fig. 2 is a section on line II—II of Fig. 1, showing the relation of the ring to the cylinder wall when the ring becomes worn;

Fig. 3 is a section of a complete ring in the plane indicated by the line III—III in Fig. 1, the ring joint being open;

Fig. 4 is an enlarged view of a portion of the ring shown in Fig. 3; and

Fig. 5 is a top plan view of a piston showing the position of the rings in a badly worn cylinder.

Referring to the drawing, the reference character 6 designates a one-piece split ring containing a conventional joint 7 and a plurality of elongated radial slots 8 connecting its inner and outer faces. The slots 8 are so cut as to form side lands 9 and 10 and a center land 11, the center land preferably being of less axial thickness than that of the side lands. The outer face of the ring 6 contains two arcuate grooves 12 and 13, separated at approximately diametrically related point 14 and 15, these points being displaced approximately 90° from a diametral plane passing through the rail joint, the plane coinciding substantially with the line designated A.

In this construction, it will be noted that the sides of the grooves 12 and 13 coincide with the sides of the slots 8, so that no corners are formed where carbon may collect. By a construction of this sort, four oil scraping edges are formed, two of which function in each direction of piston travel.

When the slots 8 are made narrow, carbon tends to collect in them, thereby interfering with the flow of oil through the ring. Consequently, I prefer to make these slots 8 of as great a width as possible without unduly weakening the ring.

When rings are initially installed in a cylinder, the outer ring faces contact with the cylinder wall throughout substantially their entire width, but when the rings become worn the top and bottom edges wear away due to the rocking action of the piston so that the face of the ring becomes more or less arcuate in cross section, as indicated in Fig. 2. In this figure, the reference character 16 designates the cylinder wall, and the line 17 shows the arcuate form to which such rings wear.

Heretofore, it has been necessary, in making double-slotted rings, to make the center land 11 relatively heavy so that when the ring becomes worn arcuate, the center land will not become broken by its contact with the cylinder wall. It is necessary to make the side lands 9 and 10 of relatively large axial thickness to prevent breakage of the rings during installation. The problem then is to design a ring in which the radial slots are wide enough to prevent clogging by carbon, and at the same time to produce a ring having wide side lands which will not break during installation, and having a thin center land capable of withstanding the wear and tear of service when the face of the ring is worn arcuate.

It is almost universal practice to manufacture piston rings so that they have a "plus circularity". This means that the ring diameter A (see Fig. 3) is greater than the ring diameter B when the ring with its joint closed is placed in a flexible band. This gives the ring greater tension on the diameter A than on the diameter B, and compensates for the weakening of the ring at the point where the joint is cut. By careful design, the amount of "plus circularity" can be so chosen as to give the ring satisfactory tension throughout its circumference. In use, the face of the ring adjacent the joint and also diametrically across from the joint, will wear away faster than the face of the ring at the ends of diameter B, because of the greater tension exerted along diameter A. This will result eventually in such wear that the diameter B becomes greater than the diameter A.

It is well known that engine cylinders become worn to elliptical form by the rocking of the piston because of the angularity of the connecting rod with respect to the axis of the piston. Consequently, in engines having badly worn cylinders the rings naturally assume such a position that their longer diameters coincide with the longer diameter of the worn cylinders. This means that in engines having badly worn cylinders, the rings, after some degree of wear, generally take up a position with the diameter A approximately parallel to the axis of the wrist pin. By examining a great number of engines having worn cylinders, I have discovered that in the majority of cases the ring joints will be found to lie within an arc of approximately 45° one side or the other of the wrist pin axis.

This will be more clear from an examination of Fig. 5 of the drawing, wherein 18 designates the top of a piston having wrist pin bearings 19 containing a wrist pin 20. This piston is shown as containing the usual three piston rings, the joints of which are designated 21, 22 and 23. If the axis of the wrist pin is designated 24, it will be found in the majority of cases that piston rings in worn cylinders will assume a position where their joints lie somewhere within the arc of angle $\theta$, either one side or the other of the wrist pin axis 24. This means that the rings have been worn to "minus circularity", i. e., that diameter B is greater than diameter A, and that the rings have shifted so that diameter B is approximately at right angles to wrist pin axis 24. It is well known that because of the rotation of an engine constantly in the same direction, oil tends to accumulate on one side of the piston, and in worn cylinders this accumulation occurs on one side or the other of wrist pin axis 24.

Accordingly, it is my purpose to provide the grooves 12 and 13 in a ring, and to separate them at points 14 and 15 so that when such rings are used in worn cylinders, this accumulation of oil may be distributed throughout the area between the lines 25 and 26 at the ends of axis 24. The grooves 12 and 13 provide arcuate passageways through which oil can pass freely, and be distributed more or less evenly over the face of the cylinder wall throughout its entire circumference without any possibility of portions of the cylinder running dry.

If the grooves were continuous the oil would have a tendency to work around the ring always in the same direction, due to the particular shape of the cylinder caused by wear, i. e. either clockwise or counterclockwise. Consequently one portion of the cylinder might not receive sufficient oil since with a continuous groove with slots therein, the oil is continually passing to the rear of the ring. By interrupting the groove at a plurality of points, however, the tendency of the oil to circulate in one direction is lessened and since the joints generally assume positions such that diametral planes passing through them are substantially in line with the axis of the wrist pin, the oil on the oily side of the piston is made to circulate in both directions, producing more perfect distribution.

Extensive experiments and tests have shown that rings embodying my invention are capable of accomplishing the results set forth above in a manner very much improved over the rings of the prior art.

It will be clear from the above description that I have designed a ring which will not only resist breakage during installation and service, but will be capable of facilitating uniform oil circulation in an improved manner which has not been known heretofore.

Although I have shown and described only one form of piston ring embodying my invention, it will be obvious that changes may be made in the details, within the scope of the claims without departing from the spirit and scope of my invention.

What is claimed is:—

1. A piston ring comprising a one-piece split ring containing two sets of parallel radial slots extending through it and dividing its outer face into two outer lands and a center land, the center land being of substantially less axial thickness than the outer lands; and a plurality of arcuate grooves in the outer face of the ring and extending circumferentially around it, said grooves relieving said center land through a substantial portion of the ring circumference, and being separated from one another at points substantially 90° removed from a diametral plane passing through the ring joint.

2. A piston ring comprising a one-piece split ring containing a series of spaced radial slots connecting the outer and inner faces of the ring; and a plurality of grooves in the outer face of the ring, said grooves being separated from one another at points subsubstantially 90° removed from a diametral plane passing through the ring joint.

3. A piston ring comprising a one-piece split ring containing a series of spaced radial slots connecting the outer and inner faces of the ring; and two grooves in the outer face of the ring and joining certain of said slots, said grooves being separated at two points each removed substantially 90° from a diametral plane passing through the ring joint.

4. A piston ring comprising a one-piece split ring containing two sets of axially spaced radial slots, said sets of slots being separated by a center land, and said center land being spaced from the outer face of the ring so as to form two arcuate grooves in said face, said grooves being separated from each other at points displaced substantially 90° from a diametral plane passing through the ring joint.

5. A split piston ring provided with a plurality of grooves, and slots extending from the bottoms of the grooves inwardly and through the inner face of the ring, at least one of said grooves being uninterrupted and extending for approximately 180 degrees around the ring, and bridges flush with the outer face of the ring extending across the ring at both ends of said uninterrupted groove, whereby a relatively long circumferential oil channel is provided between the said bridges.

In testimony whereof I have signed my name to this specification.

ALLEN W. MORTON.